(12) United States Patent
Lechleiter et al.

(10) Patent No.: US 8,262,326 B2
(45) Date of Patent: Sep. 11, 2012

(54) MACHINING UNIT FOR A MILLING AND DRILLING MACHINE

(75) Inventors: Karl Lechleiter, Oy-Mittelberg (DE); Hans Gronbach, Eisenberg (DE); Alfred Geissler, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 518 days.

(21) Appl. No.: 12/314,307

(22) Filed: Dec. 8, 2008

(65) Prior Publication Data
US 2009/0162160 A1   Jun. 25, 2009

(30) Foreign Application Priority Data
Dec. 11, 2007 (DE) .................. 20 2007 017 251 U

(51) Int. Cl.
*B23C 1/12* (2006.01)
(52) U.S. Cl. ......... 409/201; 409/136; 409/231; 408/236
(58) Field of Classification Search .............. 408/236; 409/201, 211, 216, 231, 232, 136, 135, 137
See application file for complete search history.

(56) References Cited

U.S. PATENT DOCUMENTS

| | | | |
|---|---|---|---|
| 4,069,741 A * | 1/1978 | Ewertowski | 409/211 |
| 4,126,818 A * | 11/1978 | Taylor | 318/46 |
| 4,610,584 A * | 9/1986 | Malzkorn et al. | 409/201 |
| 5,391,026 A * | 2/1995 | Wu et al. | 409/201 |
| 6,279,438 B1 | 8/2001 | Delacou | |
| 6,746,188 B2 * | 6/2004 | Watanabe | 409/201 |
| 6,932,547 B2 * | 8/2005 | Hardesty et al. | 409/201 |
| 7,891,920 B2 * | 2/2011 | Yoneyama et al. | 409/201 |
| 2010/0322734 A1 * | 12/2010 | Tatsuda et al. | 409/231 |

FOREIGN PATENT DOCUMENTS

| | | |
|---|---|---|
| DE | CH 598 899 A5 | 5/1978 |
| DE | 100 62 307 A1 | 7/2002 |
| DE | 698 05 961 T2 | 1/2003 |
| DE | 101 01 038 C2 | 3/2003 |
| JP | A-60-167728 | 8/1985 |
| JP | A-60-196487 | 10/1985 |
| JP | A-61-121846 | 6/1986 |
| JP | A-11-226828 | 8/1999 |
| JP | A-2001-150258 | 6/2001 |
| JP | A-2001-198749 | 7/2001 |

* cited by examiner

*Primary Examiner* — Erica E Cadugan
(74) *Attorney, Agent, or Firm* — Oliff & Berridge, PLC

(57) ABSTRACT

The subject-matter of the invention is a machining unit for a milling and drilling machine, comprising a spindle housing (1) which is supported on a machine part and can be moved in a longitudinal direction, a milling head (5) mounted on the face end of the spindle housing (1), a work spindle (6) supported in the milling head (5) and comprising an electric drive motor, and an energy and working stock supply to the milling head (5) formed of bunched lines and cables. The bunched lines and cables for the energy and working stock supply are disposed inside the spindle housing (1) in the shape of a string (25) and introduced into the milling head (5) via a rotary transmission leadthrough (8) on the face.

8 Claims, 1 Drawing Sheet

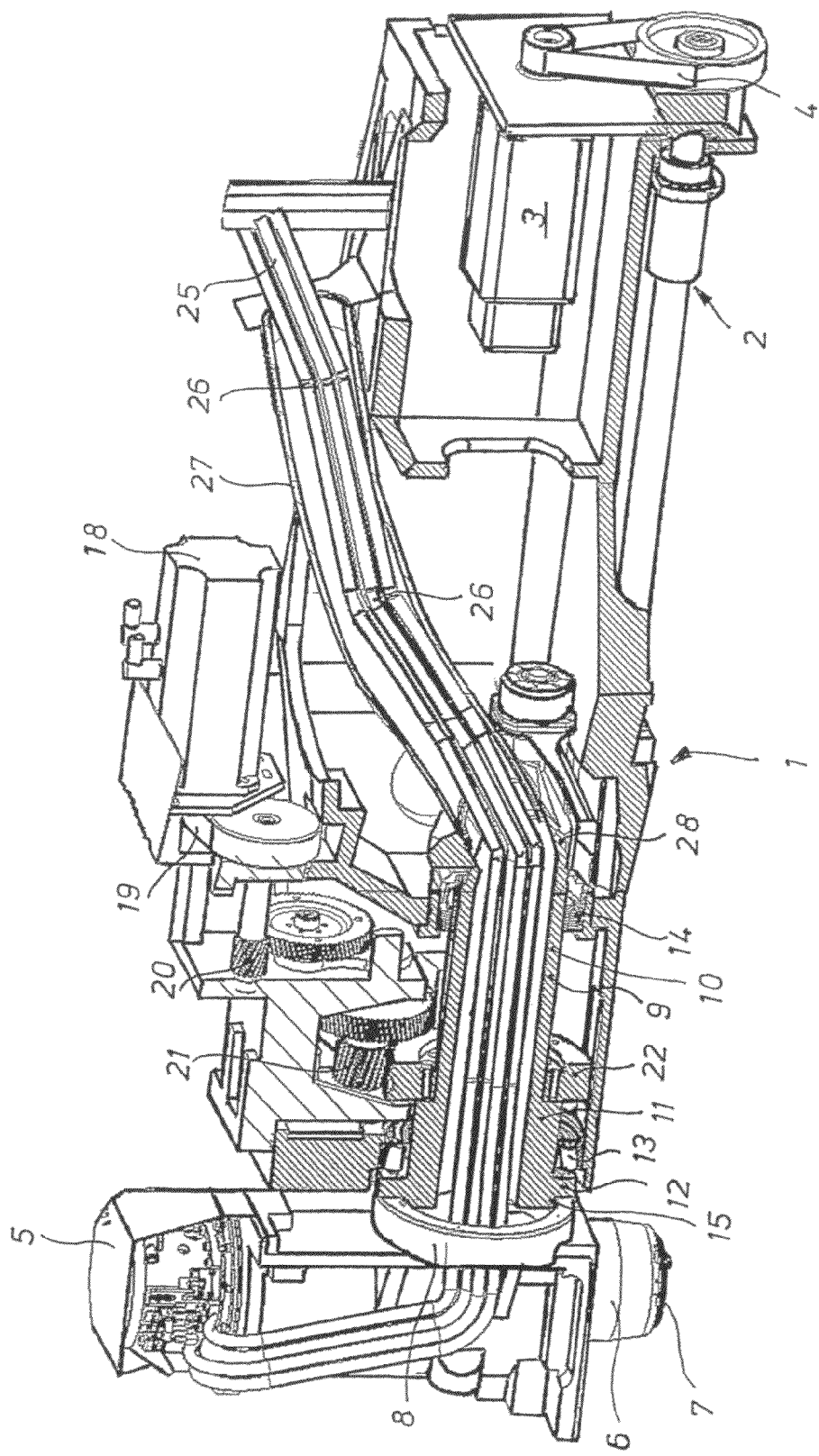

MACHINING UNIT FOR A MILLING AND DRILLING MACHINE

The invention relates to a machining unit for a milling and drilling machine, comprising a spindle housing which is supported on a machine column and can be moved by a motor, a milling head mounted on the face end of the spindle housing in a rotatable manner, a work spindle supported in the milling head comprising a built-in electric drive motor and an energy and liquid supply the cables of which are surrounded by a cover.

In milling and drilling machines energy and rinsing fluid are supplied to the spindle head, i.e. the work spindle and its drive, through operationally reliable cables and tubes which are collected as a group of cables or a so-called bunch of cables and run inside the machine along the side of the spindle housing. This bunch of cables and a surrounding elastic cover extend from the face of the machine column into the work area outside of the milling head and are connected to a side wall of the milling head in a rotatable manner. The connection of the individual energy supply cables and working substance tubes to the respective functional elements is made inside the milling head.

In a machining unit for a milling and drilling machine as shown, for example, in DE 101 01 038 C, the energy and working stock are supplied to the spindle head and its work spindle, respectively, via cables, lines or tubes which are collected in strings and surrounded by an elastic piece of tube. This piece of tube is connected to a machine part at one end and extends in an arc to the front face wall of the milling head, to which the end of the piece of tube is connected via a torsion element. As the milling head can be rotated about a horizontal axis, the length and shape of the piece of tube is designed such that the piece of tube itself and also the cables and lines located therein may follow the movements of the milling head about the horizontal axis in a largely stressfree manner. The piece of tube extending above the work area, however, requires sufficient space within the protective cabin and there is a danger of collision when bulky workpieces are machined. Furthermore, the piece of tube is exposed to the media present in the protective cabin and accordingly can be damaged by the chips produced in the milling operation and possibly also by other working stock.

It is the object of the invention to provide a machining unit for a milling and drilling machine which does not require any additional space within the protective cabin and is arranged in a manner protected against damage from chips and other working stock.

According to the invention, this object is achieved by the fact that the cables and lines for the energy and working stock supply are arranged inside the spindle housing and introduced into the milling head via a rotary transmission leadthrough on the face at the free end of the spindle housing. In the machining unit according to the invention, the cable and line strings collected in a bunch and running in parallel are introduced from the rear part of the spindle housing into the open end of a cable duct extending in the rear part of the spindle housing at a certain inclination. A bushing, which can be rotated by an electric motor via a transmission system in order to align the spindle head in desired horizontal, inclined and vertical machining positions, is connected to this cable duct and rotatably supported coaxial to the rotary axis of the milling head in the spindle housing. Longitudinal sections of the cable strings, which are parallel to the axis, run in the dimensionally stable bushing.

According to a suitable embodiment of the invention, these cable strings extend through a ring into the interior of the milling head with sufficient clearance so that they are not subject to stress due to torsional movements of the milling head and the bushing.

A functionally essential feature of the invention consists in the fact that in the central area of the spindle housing a hollow-cylindrical clearance zone is created by the rotary-driven bushing, which is suitable to accommodate the cable and line strings without any undesired stress when the individual strings are rotated or twisted by the angle-defined rotational movements of the spindle head about the horizontal longitudinal axis.

BRIEF DESCRIPTION OF DRAWINGS

FIG. 1 schematically shows a machining unit for a milling and drilling machine in a view according to the longitudinal section according to an embodiment of the present invention.

Below, an embodiment of the invention will be described in detail with reference to the drawing wherein a machining unit for a milling and drilling machine is schematically illustrated in a longitudinal section.

The machining unit as illustrated comprises a spindle housing 1 which is arranged and guided via guiding rails—not shown—on a component of a milling and drilling machine and can be slid in the longitudinal direction. A spindle drive 2 is used for the longitudinal movements of the machining unit, which in the present case contains so-called recirculating ball screw driven by an electric motor 3 via a belt transmission 4. At the left end of the spindle housing 1 in the drawing a vertical milling head 5 is mounted and can be rotated about a horizontal axis into selectable operating positions. A work spindle 6 is supported in this milling head 5, which is driven by an internal electric motor and has a tool holding fixture 7 at its lower end.

A dimensionally stable supporting ring 8 is fixed to the right side wall of the milling head 5 in the drawing. An elongated bushing 9 is rotatably supported in the front end section of the spindle housing 1 which comprises a rear thin-walled section 10 and a front thickened section 11—on the left—and a radial flange 12 at the end. A front rolling bearing 13 is located immediately adjacent to this radial flange 12. The bushing 9 is supported with its right end in the drawing in the front rolling bearing 13 and in a rear rolling bearing 14. On the face next to the radial flange 12 a ring groove 15 is formed in the bushing 9 with which the ring 8 form-fittingly engages and is permanently fixed to the bushing 9. In order to rotate the bushing 9 together with the supporting ring 8 and the milling head 5, a drive assembly provided on the movable spindle housing 1 is used which consists of an electric motor 18, a belt drive 19, a first gear pairing 20 and a second gear pairing 21, the pinion of the second gear pairing 21 driving a gear 22 fixed on the bushing 9 at the transition to the thicker front part 11 thereof, which means that the bushing 9 is made to rotate.

In the spindle housing 1 of the machining unit as shown a string 25 consisting of a bunch of a plurality of lines or cables or tubes is provided for the energy and working stock supply to the milling head 5 and its work spindle 6, respectively. The tubes and cables of this string 25 are intermittently held in the respective angular position by suitable holders 26 so that undesired transverse and torsional movements are avoided. In the right section in the drawing the string 25 runs in an arcuated duct 27 positioned and fixed inside the spindle housing 1. This duct 27 may be made of metal sheet, plastics material of sufficient dimensional stability or another suitable material. The left end of this canal duct 27 in the drawing is connected to a sleeve 28 to which the rotatable bushing 9 is connected.

Thus, the string 25 continuously extends through the duct 27, the sleeve 28, the bushing 9 and the ring 8 up into the interior of the milling head 5. It is essential that the arrangement and positioning of the individual lines and cables, particularly in the linear bushing 9 and the ring 8 forming a rotary transmission leadthrough and, adjoining thereto, in the milling head 5 is designed with such clearance that when the milling head 5 performs rotational movements about the horizontal axis, deadlocks and twistings of the individual cables relative to one another and to other components, respectively, are safely avoided.

The invention is not limited to the embodiment as shown. For example, the string 25 may also be guided out of the spindle housing 1 in a different manner, for example, in a largely linear way. Furthermore, the shape, the support as well as the rotary drive of the bushing 9 may also be formed by other suitable means, for example a direct drive engaging on the outer circumference of the bushing. Moreover, instead of the milling head 5 as shown, which can be rotated about the horizontal axis, a so-called pivoting milling head may be used which would have to comprise a sufficiently large inner central clearance zone to accommodate the string 25.

The invention claimed is:

1. A processing unit for milling and drilling having
a spindle housing that is configured to be movably mounted on a machine,
a milling head able to rotate about a rotational axis relative to the spindle housing, wherein the milling head is completely disposed outside of the spindle housing and wherein a single side surface of the milling head is attached to a free end of the spindle housing,
a working spindle that is mounted in the milling head and has a tool holding fixture and an electric drive motor,
an energy and operating medium supply is provided to the milling head, the supply being an arrangement of lines and cables, and
a rotary lead through between the spindle housing and the single side surface of the milling head for introducing the lines and cables into the milling head,
the lines and cables are disposed lengthwise along the rotational axis of the milling head within the spindle housing,
a bushing is mounted in the spindle housing such that a rotation axis of the bushing is coaxial with respect to the rotational axis of the milling head, a portion of the lines and cables extend along the bushing, and
the bushing is connected to the milling head at one end of the bushing and is coupled to a drive assembly for rotation in the spindle housing about the rotational axis of the milling head, and a duct is connected to an end of the bushing opposite the one end of the bushing that is connected to the milling head, wherein one end of the duct is within the spindle housing and an opposite end of the duct is outside the spindle housing, and portions of the lines and cables are accommodated in the duct.

2. The processing unit of claim 1, wherein the portions of the cables and lines that are-accommodated in the duct are in a predetermined order.

3. The processing unit of claim 2, wherein the duct is connected to the bushing via a sleeve.

4. The processing unit of claim 1, wherein the lines and cables are held in position by retainers.

5. The processing unit of claim 1, wherein the bushing is mounted in the spindle housing and roller bearings are on each end of the bushing.

6. The processing unit of claim 1, wherein the drive assembly coupled to the bushing comprises an electric motor mounted on the spindle housing and a gear train, a pinion of which gear train meshes with a toothed ring attached to the outer surface of the bushing.

7. The processing unit of claim 1, wherein at the single side surface of the milling head is a stable supporting ring disposed on a single side wall of the milling head.

8. The processing unit of claim 7, wherein the stable supporting ring is configured to be form-fittingly mounted to the bushing to connect the milling head to the spindle housing.

* * * * *